United States Patent
Berckmans et al.

(10) Patent No.: US 11,716,970 B2
(45) Date of Patent: Aug. 8, 2023

(54) METHOD FOR MONITORING A LIVESTOCK FACILITY AND/OR LIVESTOCK ANIMALS IN A LIVESTOCK FACILITY USING IMPROVED SOUND PROCESSING TECHNIQUES

(71) Applicant: SoundTalks NV, Leuven (BE)

(72) Inventors: Dries Berckmans, Leuven (BE); Wim Buyens, Kapellen (BE)

(73) Assignee: SoundTalks NV, Leuven (BE)

( * ) Notice: Subject to any disclaimer, the term of this patent is extended or adjusted under 35 U.S.C. 154(b) by 296 days.

(21) Appl. No.: 17/295,812

(22) PCT Filed: Dec. 18, 2019

(86) PCT No.: PCT/EP2019/085897
§ 371 (c)(1),
(2) Date: May 20, 2021

(87) PCT Pub. No.: WO2020/127449
PCT Pub. Date: Jun. 25, 2020

(65) Prior Publication Data
US 2022/0007618 A1    Jan. 13, 2022

(30) Foreign Application Priority Data
Dec. 18, 2018  (BE) .................... 2018/5899

(51) Int. Cl.
*A01K 29/00* (2006.01)
*G10L 21/0208* (2013.01)
(Continued)

(52) U.S. Cl.
CPC ........ *A01K 29/005* (2013.01); *G10L 21/0208* (2013.01); *G10L 25/30* (2013.01); *G10L 25/51* (2013.01); *G10L 2021/02166* (2013.01)

(58) Field of Classification Search
None
See application file for complete search history.

(56) References Cited

U.S. PATENT DOCUMENTS

2006/0256991 A1* 11/2006 Oxford ................. H04R 1/406
                                                                381/361
2007/0150268 A1   6/2007 Acero
(Continued)

FOREIGN PATENT DOCUMENTS

| CN | 108198562 A | 6/2018 |
| EP | 2783629 A1 | 10/2014 |
| WO | 2020127449 A1 | 6/2020 |

OTHER PUBLICATIONS

ISR-WO dated Jan. 31, 2020 for parent application PCT/EP2019/085897.

(Continued)

*Primary Examiner* — Paul W Huber
(74) *Attorney, Agent, or Firm* — Vorys, Sater, Seymour and Pease LLP

(57) ABSTRACT

The invention concerns a method for monitoring a livestock facility and/or livestock animals in a livestock facility. It includes receiving audio signals comprising sounds generated in a livestock facility from two or more microphones. Sounds of interest in the audio signals are localized, the sounds of interest being both sounds generated by livestock animals and sounds generated by noise sources. The localization further comprises the steps of utilizing models of noise sources in an airspace based on localization in noise reduction algorithms to filter off noise sources from the audio signal, resulting in a filtered audio signal, and the step of analysing the filtered audio signal.

15 Claims, 4 Drawing Sheets

(51) Int. Cl.
  *G10L 25/30*   (2013.01)
  *G10L 25/51*   (2013.01)
  *G10L 21/0216*   (2013.01)

(56) References Cited

U.S. PATENT DOCUMENTS

2009/0312660 A1* 12/2009 Guarino ................ G16H 50/80
                                                              600/529
2019/0307106 A1* 10/2019 Hartung ................ A01K 29/00

OTHER PUBLICATIONS

Vasileios Exadaktylos et al, "Sound Localisation in Practice: An Application in Localisation of Sick Animals in Commercial Piggeries", "Advances in Sound Localization", Apr. 11, 2011 (Apr. 11, 2011), InTech.

Ferrari S et al, "Cough sound analysis to identify respiratory infection in pigs", Dec. 1, 2008 (Dec. 1, 2008), vol. 64, No. 2, p. 318-325.

* cited by examiner

METHOD FOR MONITORING A LIVESTOCK FACILITY AND/OR LIVESTOCK ANIMALS IN A LIVESTOCK FACILITY USING IMPROVED SOUND PROCESSING TECHNIQUES

FIELD OF INVENTION

The invention relates to a method for monitoring a livestock facility and/or livestock animals in a livestock facility using improved sound processing techniques. More specifically, present invention relates to utilizing two or more microphones to capture the sounds generated in a livestock facility and using signal processing techniques such as beamforming or more advanced signal processing techniques such as neural networks for analyzing/localizing the sounds. Further, the present invention utilizes improved localization and modeling of noise sources in a noise reduction algorithm to filter off or analyze noise sources from the received captured signal.

BACKGROUND

Livestock monitoring has become a crucial aspect for analyzing livestock animal behavior, livestock animal health and/or welfare. Various monitoring devices are being utilized for determining livestock environment, where different type of sensors are used such as temperature sensor, relative humidity sensor, ammonia sensor, acoustic sensors (microphone), movement sensors, light sensors, etc.

For monitoring a livestock facility, sound analysis plays an important role for determining the health and/or welfare of livestock animals. Livestock animal sounds (cough, sneeze, scream etc.) detected by monitoring devices can be correlated with the presence of diseases and/or unfavorable conditions. However, noise generated in the livestock animal's surrounding such as sounds generated by ventilation system, feeding line system, surrounding traffic of vehicle, humans, transportation systems in the livestock facility creates difficulty in proper analysis of the livestock animal sounds and often leads to faulty identification. Moreover, reduction of the noise in the audio signal is crucial and identifying the exact location of the livestock animals in the livestock facility is still a big concern in the industry.

EP2783629A1 discloses a method and/or system for monitoring the cough sounds of cattle with a microphone connected with a computing device, in which the computing device records the sounds made by the animals and performs filtering operations to filter off background noises.

US2009/0312660A1 discloses system and method for the recognition of respiratory status of a mammal. It includes one or more sensors such as microphones for capturing a remote cough event and localizing the cough event by estimating the time difference of arrival of the sound signal captured by the microphones. Further, an algorithm is used for exclusion of background sound noise that may also provide a method for locating coughs originating from the carrier of the device.

None of the prior art in technology domain talk about localizing the non-animal sound sources, i.e. the noise sources such as ventilation systems, heating systems, cleaning systems, feeding lines, etc., present in the livestock facilities to improve noise filtration in the audio signal. The present invention overcomes this problem by localizing the noise sources in the airspace and modeling them more accurately in a noise reduction algorithm to filter off the noises from animal sounds. The filtered signal can be analyzed more accurately to obtain information regarding the health and/or welfare of livestock animals. Accurate modeling of noise sources is also useful for detecting potential malfunctioning of machines, such as ventilation, feeding lines, etc., in a livestock facility. The invention further utilizes two or more microphones to capture the sounds generated in a livestock facility and further utilizes signal processing techniques such as beamforming or more advanced signal processing techniques such as neural networks for analyzing/localizing the sounds.

OBJECT OF THE INVENTION

Accordingly, it is a prime objective of the present invention to overcome the above mentioned disadvantages of the prior art by providing a method that utilizes two or more microphones to capture the sounds generated in a livestock facility for monitoring the livestock facility and/or livestock animals in a livestock facility.

Another objective of the present invention is to combine the sounds captured from the microphones using beamforming techniques or more advanced signal processing techniques such as neural networks to analyze/localize the sound of interest in the combined audio signal.

Another objective of the present invention is to localize noise sources in the airspace and model them more accurately in a noise reduction algorithm to filter off the noises. Accurate modeling of noise sources is also useful for detecting potential malfunctioning of machines, such as ventilation, feeding lines, etc., in a livestock facility.

Another objective of the present invention is to implement an environment classifier to detect activities in a livestock facility at any time by combining various algorithms.

Another objective of the present invention is to monitor the livestock animals by analyzing the filtered audio signal produced by noise reduction algorithm or by using more advanced techniques such as neural networks.

Another objective of the present invention is to analyze the speed and direction of the spread of a certain disease in a livestock facility using the localization of livestock animal sounds.

Another objective of the present invention is to implement a sound interaction mechanism using two or more microphones and loudspeaker of the monitoring device. Said sound interaction mechanism also allows interaction of the device with livestock animals. A non-limiting example of a configuration to allow interaction of the device with the livestock animals is the playing of calming sounds through the loudspeaker in response to detected aggression of the livestock animals.

Another objective of the present invention is to improve the environment classifier using two-way sound interaction mechanism.

BRIEF DESCRIPTION OF DRAWINGS

The above and other objects, features and advantages of the invention will become apparent from a consideration of the following detailed description presented in connection with the accompanying drawings in which.

DETAILED DESCRIPTION

Figure 1:
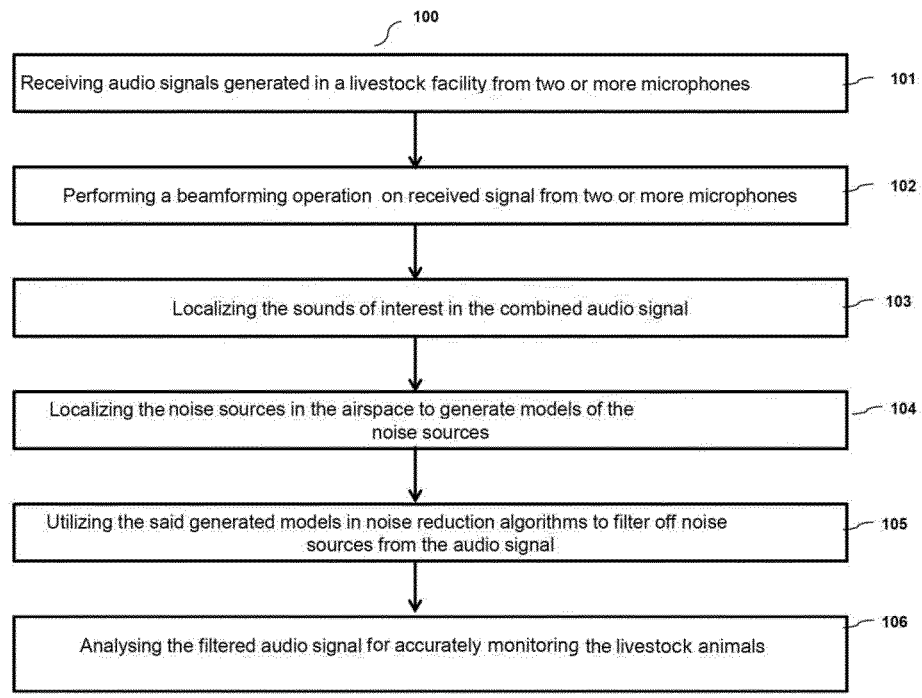
FIG. 1 illustrates a flow diagram of the steps involved in monitoring livestock animals in a livestock facility in accordance with the present invention.

While this solution may be subject to various modifications and take alternative forms, it has been illustrated as an example in the accompanying drawings and will be described in detail below. However, it should be understood that this solution is not intended to be limited to the specific forms disclosed.

Some aspects comparable in terms of scope, the disclosed embodiments are described below. It should be understood that these aspects are presented merely to provide the reader with a brief summary of certain forms that could take the solution and that these aspects are not intended to limit its scope. Indeed, this solution can encompass a variety of aspects that may not be defined below.

The term "user" may indicate an owner of the facility and can be any "farmer", "producer", "integrator", "veterinarian" or "administrator" responsible for taking care of the livestock animals at a livestock facility.

The term "airspace" may be used interchangeably with "animal section" or "zone" or "space" or "barn" or "facility".

The term "livestock facility" may be used interchangeably with "barn" or "installation" or "room" or "facility".

The term "livestock animal" may include "cattle", "pigs", "horses", "goats", "poultry", "pets" and any animal which can be raised in livestock facilities.

The term "health", as used in the present text, refers to the absence of disease, pain and distress.

The term "welfare", as used in the present text, refers to how a livestock animal is coping with the conditions in which it lives. A livestock animal is in a good state of welfare if, preferably as indicated by scientific evidence, it is healthy, comfortable, well nourished, safe, able to express innate behaviour, and if it is not suffering from unpleasant states such as pain, fear, and distress.

The term "thermal discomfort", as used in the present text, refers to temperature shock, heat stress and/or cold stress. For example, pigs cannot cope with a temperature shock corresponding to a temperature decrease of 4° C. in one hour.

The term "heat stress", as used in the present text, refers to a situation where too much heat is absorbed by a person, a plant or an animal, preferably a livestock animal, and causes stress, illness or even death. Heat stress occurs when a body cannot cool itself enough to maintain a healthy temperature. Heat stress is manifested by elevated body temperature, hot, dry skin, lack of sweating and/or neurological symptoms such as paralysis, headache vertigo and/or unconsciousness. It can also cause heat cramps, heat exhaustion and heat stroke, which may lead to death.

The term "neural networks", as used in the present text, refers to a network typically comprising an input layer, possibly a number of hidden layers and an output layer each containing different units. The input can be either a set of features or raw audio signals from multiple microphones. A neural network is able to detect patterns in the input data, can extract or identify new useful features, can learn to perform classification tasks, spatial localization of sound events, dereverberation and denoising.

Commonly, the term "artificial intelligence" is applied when a machine mimics "cognitive" functions that humans associate with other human minds, such as "learning" and "problem solving" (known as Machine Learning). As machines become increasingly capable, mental facilities once thought to require intelligence are removed from the definition. For instance, optical character recognition is no longer perceived as an example of "artificial intelligence", having become a routine technology. Capabilities currently classified as artificial intelligence include successfully understanding human speech, competing at a high level in strategic game systems (such as Chess and Go), self-driving cars, intelligent routing in content delivery networks, and interpreting complex data.

The present invention relates to a method for monitoring a livestock facility and/or livestock animals in a livestock facility, the method comprising the steps of:
  a. receiving audio signals comprising sounds generated in a livestock facility from two or more microphones;
  b. localizing sounds of interest in the audio signals, the sounds of interest being both sounds generated by livestock animals and sounds generated by noise sources, wherein the step of localizing further comprises the steps of:
    i. utilizing models of noise sources in an airspace based on localization in noise reduction algorithms to filter off noise sources from the audio signal, resulting in a filtered audio signal
    ii. analysing the filtered audio signal.

Most preferably, said steps are performed in the indicated order.

According to an embodiment, the step of analysing the filtered audio signal is limited to collecting the filtered audio signal for further use of a third person, e.g. a veterinarian or a farmer. According to another embodiment, the step of analysing the filtered audio signal comprises the collection of the filtered audio signal and the comparison of one or more collected filtered audio signals with standard values.

According to yet another embodiment, the step of analysing the filtered audio signal comprises the collection of the filtered audio signal, the comparison of one or more collected filtered audio signals with standard values, and the finding of any significant deviation during said comparison.

In a preferred embodiment, the invention provides a method for monitoring a livestock facility and/or livestock animals in a livestock facility according to the invention, wherein a beamforming operation or more advanced signal processing techniques such as neural networks, performed to combine the audio signals from two or more microphones into combined audio signals, are selected as techniques in the localization of sounds of interest.

In a preferred embodiment, the invention provides a method for monitoring a livestock facility and/or livestock animals in a livestock facility according to the invention, wherein the step of localizing further comprises the step of localizing the noise sources in an airspace to generate models of the noise sources in an airspace based on localization, prior to utilizing said models in noise reduction algorithms to filter off noise sources from the audio signal, resulting in a filtered audio signal. For example, said models of noise sources might be generated in advance, e.g. without livestock animals within the livestock facility, in order to filter off noise sources when recording sounds generated by the livestock animals.

In a preferred embodiment, the invention provides a method for monitoring a livestock facility and/or livestock animals in a livestock facility according to the invention, wherein the step of localizing further comprises the step of analysing the models of the noise sources in order to analyse the functioning and/or malfunctioning of corresponding systems in the livestock facility. Preferably, audio models of said systems when functioning, and most preferably models of each functioning system individually and models of any combination of two or more of said functioning systems, are recorded in an earlier step. By comparing actual sounds generated by noise sources with the audio models, malfunctioning of one or more systems can be detected and malfunctioning systems can be deactivated and repaired subsequently. Instead of, in general, solely using models of noise sources to filter off noise sources from an audio signal, as could be expected to be within the scope of customary practice, the models of the noise sources are, according to the present invention, additionally used to analyse the functioning and/or malfunctioning of systems producing the noise.

In a preferred embodiment, the invention provides a method for monitoring a livestock facility and/or livestock animals in a livestock facility according to the invention, wherein beamforming or more advanced signal processing techniques such as neural networks and localization techniques are based on time and level difference of the sound of interest in the received audio signals.

In a preferred embodiment, the invention provides a method for monitoring a livestock facility and/or livestock animals in a livestock facility according to the invention, wherein noise reduction algorithm is a standard classic noise reduction algorithm based on spectral subtraction.

In a preferred embodiment, the invention provides a method for monitoring a livestock facility and/or livestock animals in a livestock facility according to the invention, wherein the noise sources comprise ventilators, heating systems, cleaning systems, feeding lines, drinking systems, music systems, and/or human voices.

In a preferred embodiment, the invention provides a method for monitoring a livestock facility and/or livestock animals in a livestock facility according to the invention, wherein the method is applicable to both stationary as well as non-stationary noise sources.

In a preferred embodiment, the invention provides a method for monitoring a livestock facility and/or livestock animals in a livestock facility according to the invention, wherein the localization of sounds generated by livestock animals is used to analyse the speed and direction of the spread of a certain disease in a livestock facility.

In a preferred embodiment, the invention provides a method for monitoring a livestock facility and/or livestock animals in a livestock facility according to the invention, wherein the localization of sounds generated by livestock animals is used to analyse welfare of livestock animals in a livestock facility.

In a preferred embodiment, the invention provides a method for monitoring a livestock facility and/or livestock animals in a livestock facility according to the invention, wherein the method further comprises an environment classifier which indicates different activities in a livestock facility by combining different sensors in different algorithms, wherein the different activities may include activities performed by livestock animals, e.g. activities performed by livestock animals indicative of their health and/or welfare, activities performed by humans, and functioning of one or more systems installed in a livestock facility selected from the group comprising ventilation systems, feeding lines, sprinklers, drinking systems, heating systems, cleaning systems, music systems and artificial lights.

In a preferred embodiment, the invention provides a method for monitoring a livestock facility and/or livestock animals in a livestock facility according to the invention, wherein the different algorithms are selected from the list comprising noise reduction algorithm, ventilation detection algorithm, feeding line detection algorithm, algorithm for detecting one or more livestock animal sounds related to one or more diseases and/or aggression of said livestock animals, voice activity detection algorithm, device localization algorithm, thermal discomfort detection algorithm, reverberation estimation algorithm, staff aggression algorithm and staff tracking algorithm.

In a preferred embodiment, the invention provides a method for monitoring a livestock facility and/or livestock animals in a livestock facility according to the invention, wherein the method further comprises an environment classifier which indicates different activities in a livestock facility by combining input from different sensors and analysing the input with different algorithms, which algorithms generate as output an indication of the different activities, wherein the different activities comprise activities performed by livestock animals, activities performed by humans, and functioning of one or more systems installed in a livestock facility selected from the group comprising ventilation systems, feeding lines, sprinklers, drinking systems, heating systems, cleaning systems, music systems and artificial lights, wherein the different algorithms are selected from the list comprising noise reduction algorithm, ventilation detection algorithm, feeding line detection algorithm, algorithm for detecting one or more livestock animal sounds related to one or more diseases and/or aggression of said livestock animals, voice activity detection algorithm, device localization algorithm, thermal discomfort detection algorithm, reverberation estimation algorithm, staff aggression algorithm and staff tracking algorithm.

Microphones can be interpreted as acoustic sensors.

For example, activities performed by livestock animals can be related to animal behaviour. For this, based on a level of sound input and/or specific animal vocalisations picked up by one or more microphones, the environment classifier can indicate active versus not active travel patterns of livestock animals. Also, for example, based on a combination of one or more light sensors for detecting light or darkness, one or more temperature sensors for measuring the temperature and one or more microphones to monitor sounds, an indication of a number of animals in a livestock facility can be given or an indication of an empty livestock facility can be given. Also, based on cough and sneeze detection by one or more microphones together with the use of a temperature sensor which can detect a temperature shock, a potential disease outbreak can be indicated. Also, based on temperature detection by one or more temperature sensors and relative humidity detection by one or more relative humidity sensors, heat stress can be indicated. Also, based on light detection by light sensors and sound detection by microphones, an indication of animal stress during dark periods can be given, given it should normally be quiet during dark periods in the absence of stress.

For example, activities performed by humans can be related to human behaviour. For this, based on speech detection by one or more microphones, the environment classifier can indicate human presence. Also, for example, based on detection of human shouting and/or screaming of livestock animals by one or more microphones, human aggression can be indicated.

For example, by detection of sounds which originate from functioning systems installed in a livestock facility by one or more microphones, and modelling the input by use of an algorithm, the environment classifier can indicate anomalies when a system fails. For detection of failure of a ventilation system, for example, temperature input from one or more temperature sensors in combination with outside temperature are also included in the modelling performed by an algorithm. Outside temperature can be understood as the temperature outside the livestock facility. Also, by detection of sounds which originate from functioning systems installed in a livestock facility by one or more microphones, and modelling the input by use of an algorithm, the environment classifier can model acoustic features of all systems installed in a livestock facility.

In a preferred embodiment, the invention provides a method for monitoring a livestock facility and/or livestock animals in a livestock facility according to the invention, wherein the localization of noise sources can be used in a ventilation detection algorithm and/or feeding line detection algorithm.

It is a purpose of the present invention to characterize background sounds or sounds of noise sources in order to better identify sounds in the barn. On the one hand, by removing the background sound, such as ventilation noise, foreground sounds, such as coughs and sneezes, can be classified more accurately. On the other hand, the characterization of the background sound itself contains useful information such as for detecting technical problems with machines. Moreover, by identifying the different sounds in a livestock facility, an automatic detection of the evolution of a production period can be performed.

In a preferred embodiment, the ventilation detection algorithm defines acoustic features that characterize a ventilation system in an audio signal. Using these features, the ventilation detection algorithm makes a model that describes the functioning of the ventilation system. Deviation from this model can be seen as malfunctioning.

In a preferred embodiment, the feeding line detection algorithm defines acoustic features that characterize a feeding line in an audio signal. Using these features, the feeding line detection algorithm makes a model that describes the functioning of the feeding line. Deviation from this model can be seen as malfunctioning.

In a preferred embodiment, the algorithm for detecting one or more livestock animal sounds related to one or more diseases and/or aggression of said livestock animals uses sound input detected by one or more microphones, from which background sounds or sounds of noise sources are removed from the sound input, followed by the identification and classification of different acoustic events by the algorithm, such as coughing and sneezing of livestock animals.

In a preferred embodiment, the device localization algorithm uses input from different loudspeakers and microphones, which different loudspeakers and microphones are installed on multiple devices. A known signal sent out from a loudspeaker on a specific device is picked up by the other devices in an airspace within a livestock facility and with localization techniques, i.e. by detecting time and level difference on multiple devices, the positioning of the different devices in the airspace can be visualised by using the algorithm.

In a preferred embodiment, the thermal discomfort detection algorithm combines input from temperature and relative humidity sensors and plots the input in a two-dimensional image, wherein, on the basis of the input, the thermal discomfort detection algorithm identifies areas in which livestock animals are suffering from heat or cold stress.

In a preferred embodiment, the reverberation estimation algorithm or in general an acoustics estimation algorithm determines on the basis of sound input from one or more microphones an estimation of acoustics in an airspace of a livestock facility, and also estimates a reverberation time. The estimation of reverberation time can be calculated from a known output signal from a loudspeaker on a device, which is detected by microphones of the same device or by microphones on another device, or from external audio input. The estimation of reverberation time is useful as a feature for event classification, for example classification of coughs, it can be used to distinguish large and small livestock facilities, it can distinguish empty versus non-empty livestock facilities, and it can even track the growth of livestock animals in a livestock facility, since by growing of the livestock animals the acoustics of the livestock facility change.

In a preferred embodiment, the staff aggression algorithm uses sound input from one or more microphones, on the basis of which input the algorithm determines staff aggression on the basis of detection of shouting from humans and/or screaming of livestock animals.

In a preferred embodiment, the staff tracking algorithm uses Bluetooth tracking and/or sound input detected by microphones to detect speech presence in audio signals, on the basis of which speech presence combined with Bluetooth tracking the algorithm is able to track a staff of a livestock facility.

In a preferred embodiment, the invention provides a method for monitoring a livestock facility and/or livestock animals in a livestock facility according to the invention, wherein the method is implemented using a monitoring device comprising two or more microphones, a loudspeaker, and a plurality of sensors.

In a preferred embodiment, the invention provides a method for monitoring a livestock facility and/or livestock animals in a livestock facility according to the invention, wherein the method further comprises implementing a sound interaction mechanism using the two or more microphones and loudspeaker of the monitoring device. Preferably, the sound interaction mechanism involves that based on one or more sounds detected by the microphones, the loudspeaker provides a response to that sound.

In a preferred embodiment, the invention provides a method for monitoring a livestock facility and/or livestock animals in a livestock facility according to the invention, wherein the sound interaction mechanism comprises taking input from a user regarding unidentified noises in the livestock facility and learning the user's response to improve the environment classifier with but not limited to a self-learning method. In a machine learning context, it is generally known that "active learning" or "self-learning" means that a learning algorithm is actively querying an expert to improve its classification performance.

In a preferred embodiment, the invention provides a method for monitoring a livestock facility and/or livestock animals in a livestock facility according to the invention, wherein the device localization algorithm helps in the localization of multiple monitoring devices in a room, checking proper installation of the devices and correlating results from the sensors on the different devices. In an embodiment, the device localization algorithm makes use of the strength of wireless communications, e.g. Wi-Fi, signals between sound monitoring devices comprising microphones. According to another embodiment, the device localization algorithm makes use of sound signals emitted by a loudspeaker and detected by microphones of sound monitoring devices comprising microphones and a loudspeaker. By doing this, the distance can be calculated from the loudspeaker of one specific device towards the microphones of other such devices in an airspace of a livestock facility. By combining the results from all pairs of devices, combined with the strength of a Wi-Fi signal in a Wi-Fi mesh network between all pairs of devices, a proper installation can be checked automatically.

In a preferred embodiment, the invention provides a method for monitoring a livestock facility and/or livestock animals in a livestock facility according to the invention, wherein the voice activity detection algorithm uses time-frequency representation or any other representation to investigate typical sound characteristics of human voices by extracting audio features from certain sound events and classifying speech and non-speech events.

In a preferred embodiment, the invention provides a method for monitoring a livestock facility and/or livestock animals in a livestock facility according to the invention, wherein the sound interaction mechanism comprises taking information from the sound of the livestock animals in the livestock facility (for example but not limited to aggression detection) and providing loudspeaker response (for example but not limited to classical music or natural vocalizations of the mother animal) to influence the behaviour of the livestock animals. E.g. sounds can be used to calm down livestock animals in a response to aggression detection, but as a response to boredom one could initiate a game with sounds for example. In a preferred embodiment, said loudspeaker response is a sound output provided through a loudspeaker, which loudspeaker response is for example but not limited to classical music or natural vocalizations of a mother animal. In a preferred embodiment, one or more microphones detect sounds, an algorithm processes the sounds and extracts sound features/events and classifies them to a specific behaviour, for example classifies them to be indicative for active animals, aggressive animals or sleeping animals. As a response to this classification, the loudspeaker can influence the behaviour of livestock animals by playing sounds which are suitable to influence the behaviour. For example, if stress or aggression is detected, calming sounds, such as classical music or sounds of a mother animal, can be played by the loudspeaker.

In a preferred embodiment, the invention provides a method for monitoring a livestock facility and/or livestock animals in a livestock facility according to the invention, wherein outputs of the different sensors of one or more devices in one or more airspaces is analysed in but not limited to a self-learning neural network. Preferably, the self-learning neural network utilizes pattern recognition and correlation of all sensor data, e.g. data from different devices each comprising multiple microphones, relative humidity sensors, temperature sensors, and light sensors. In a preferred embodiment, the correlation of all sensor data is performed by a big data correlation process. Preferably, the self-learning neural network includes unsupervised learning functionalities and is able to perform clustering methods, which can be used in making classification algorithms more robust.

In a preferred embodiment, the invention provides a method for monitoring a livestock facility and/or livestock animals in a livestock facility according to the invention, wherein the outputs of different sensors and environment classifier of one or more devices in one or more airspaces is analysed over multiple rounds with artificial intelligence in order to optimize animal production (such as but not limited to optimisations related to feed, feeding times, light patterns, temperature distribution, ventilation optimisation, sound level, acoustics, etc.) and welfare. Preferably, artificial intelligence is used for interpreting complex data. Preferably, artificial intelligence is performed by artificial intelligence means selected from the list comprising artificial neural networks, fuzzy systems and artificial intelligence databases. With multiple rounds is referred to multiple production rounds of raising livestock animals. Accordingly, all raw sensor data and outputs from above mentioned algorithms can be correlated with production results from a slaughterhouse, which production results include livestock animal weight and livestock animal welfare scores. Based on these correlations, management decisions can be made to improve production results in a later production round. Combination of all sensor data from multiple devices in one airspace for a full production round, coupled with production results, results in crucial information for optimisation of livestock animal production and welfare. With the term "production" as in livestock animal production, or as in production results from a slaughterhouse, is referred to the production of animal goods, such as meat, dairy, wool, and leather, and is preferably referred to the production of meat.

In a preferred embodiment, the invention provides a method for monitoring a livestock facility and/or livestock animals in a livestock facility according to the invention, wherein the livestock animals are selected from the group consisting of cattle, pigs, horses, goats, poultry, pets and any animal which can be raised in livestock facilities.

In a preferred embodiment, the invention provides a method for monitoring a livestock facility and/or livestock animals in a livestock facility according to the invention, wherein the livestock animals are one or more pigs.

In a preferred embodiment, the invention provides a method for monitoring a livestock facility and/or livestock animals in a livestock facility according to the invention, wherein the livestock animals are one or more chickens.

In a preferred embodiment, the invention provides a method for monitoring a livestock facility and/or livestock animals in a livestock facility according to the invention, wherein the livestock animals are one or more turkeys.

In a preferred embodiment, the invention provides a method for monitoring a livestock facility and/or livestock animals in a livestock facility according to the invention, wherein the analyzed filtered audio signal is used for monitoring health and/or welfare of the livestock animals.

In a preferred embodiment, the invention provides a method for monitoring a livestock facility and/or livestock animals in a livestock facility according to the invention, wherein the health and/or welfare of livestock animals is localized to indicate the location of healthy and unhealthy livestock animals at a moment in time.

A highly desired feature of a method according to the present invention is the combination of localizing and modeling the noise sources and relating this to animal sounds/behavior of livestock animals inside a livestock facility. For example, stress is detected in an animal sound, and malfunctioning of ventilation is detected, the combination provides intelligent warning to a farmer.

The disclosure is further described by the following non-limiting figures which further illustrate the disclosure, and which are not intended to, nor should they be interpreted to, limit the scope of the disclosure.

FIGURES

Description of FIG. 1

Referring to FIG. 1, the flow diagram of the steps involved in monitoring livestock animals in a livestock facility in accordance with the present invention. In the first step 101, audio signals are received using two or more microphone which is generated inside the livestock facility. The two or more microphones are positioned on a monitoring device and are arranged in such a manner that a combination of time difference and level difference between two or more microphones makes it possible to point to certain directions. The audio signals received by using the microphones include sounds generated by livestock animals as well as noise generated by ventilation, feeding line, human voices etc. At step 102, beamforming operation (or more advanced signal processing techniques such as neural networks) is performed on the audio signals received from the two or more microphones to generate a combined audio signal and the sounds of interest are then localized in step 103. Localization here means detection of the sound source coordinates in three-dimensional area of interest. At step 104, the noise sources are localized in the airspace and their models are generated. At step 105, generated noise source models are utilized in a noise reduction algorithm to filter off noise sources from the audio signal. Finally, at step 106 filtered audio signals are analyzed for accurately monitoring the livestock animals. Accordingly, the location and/or different sound-based characteristics of the livestock animals can be deducted from the filtered audio signals. Such monitoring may non-limitedly be used for monitoring the health and/or welfare of the livestock animals. Next to the filtered audio signals (the foreground signal), the generated noise source models (the background signal) can be used as such to detect possible malfunctioning of machines such as ventilation, feeding lines, etc.

The noise reduction algorithm may be but is not limited to a standard noise reduction algorithm based on spectral subtraction which is intended to decrease the noise level without affecting the signal quality. The algorithm calculates the periodogram (i.e. time-frequency representation) from the audio signal using Fast Fourier transform (FFT), and by smoothening the periodogram background noise is estimated with minimum-statistics. The estimated background noise is subtracted from the periodogram which produces a filtered audio signal. This approach works well with stationary noise sources (such as ventilation systems). Since the monitoring device comprises multiple microphones beamforming (or more advanced signal processing techniques such as neural networks) is performed to localize/analyze the noise sources and reduce the audio signals that are coming from that direction and thus filtering the non-stationary noise sources (such as feeding line noise) as well.

Figure 2:
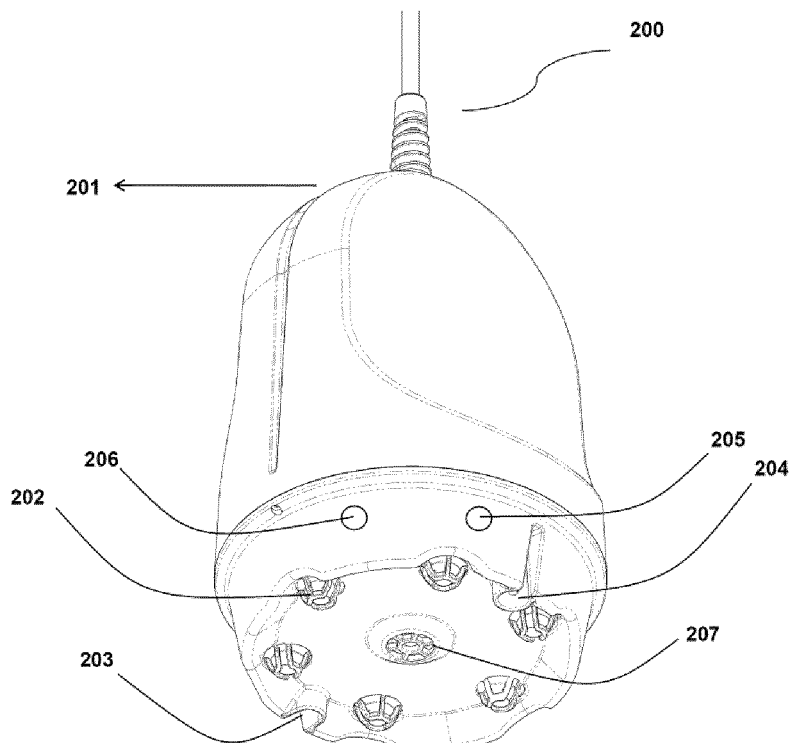
FIG. 2 illustrates a pictorial representation of exemplary device 200 for monitoring the commercial sites for livestock animals.

Description of FIG. 2

FIG. 2 illustrates a pictorial representation of exemplary device 200 for monitoring the commercial sites for livestock animals. The device may be positioned at any appropriate position in the livestock facility so as to accurately monitor the surrounding environment. A single device is capable of monitoring group of livestock animals. For example, group of livestock animals can be approximately 200-250 livestock animals per device in case of pigs. In bigger installations comprising more than 250 pigs, multiple devices may be installed in one open space (referred to as air space) which thus enables the owner of the livestock facility to visualize the status of the whole installation on airspace level. The device can be installed easily on the livestock facility by means of powering it through a power cable. The livestock facilities comprise heating and cooling (ventilation) systems to regulate the temperature and keep the livestock animals in their most thermo-comfortable zone (age related) so they can use all their energy for growth and thus meet meat production. The livestock facilities also comprise feeding line systems for feeding the livestock animals, lights to potentially impose an artificial pattern of day or night to improve the growing of certain species As shown in the FIG. 2, the device 200 is made up of a housing 201 comprising two or more microphones 202-1 . . . 202-6, herein collectively referred as the microphones 202 and individually referred as microphone 202, temperature sensor 203, relative humidity sensor 204, LEDs 205, light sensor 206, loudspeaker 207. The housing 201 is mainly dome-shaped and can be manufactured from polypropylene, polyethylene and/or polyvinylchloride. The housing 201 is connected to an electrical wire for providing electrical energy via connections to said microphones 202, temperature sensor 203, relative humidity sensor 204, LEDs 205, light sensor 206 and loudspeaker 207.

The device comprises two or more microphones 202 for recording the sounds produced in the livestock facilities. Preferably the device includes six microphones arranged in a circular periphery on the bottom part of the housing. All the microphones are placed in a plane and are pointing downwards. The microphones are configured to capture the sounds generated by the livestock animals which are later analyzed to monitor the livestock animals. On the basis of the monitoring of the livestock animals, the health and/or welfare could be determined by a third party, e.g. by a farmer or a veterinarian. The microphones also capture the sounds generated by the various systems including heating systems, ventilation systems, feeding lines, cleaning systems, etc. The sounds of diseases have a sound associated with them, like coughing, sneezing and snicking, and may easily be captured in microphone 202. Issues such as aggression, tail biting, etc can also be associated with certain sounds (for example but not limited to screaming). Malfunctioning of feeding lines or ventilations or heating system is audible and thus detectable through microphone 202. Multiple microphones 202 allows for potential extra functionalities such as sound source localization, noise reduction, dereverberation and determining directionality of sound and more advanced signal processing techniques such as neural networks. Sound source localization is achieved by using beamforming techniques (or alternative techniques) and is helpful in identifying the direction of origin of both livestock animal sounds and noises.

The temperature sensor 203 is located outside of the housing so it can measure the environmental temperature in the livestock facility. The comfort and growth of livestock animals is very much linked to the temperature they are feeling. If the temperature is too low, the livestock animal will feel cold and will use energy to generate heat. Utilized energy will not be available anymore for growing. Just like human beings, livestock animals can adapt themselves to changing temperature if the change is gradual. Sudden drops can lead to high intolerance and disease outbreak due to lower biological resistance of the livestock animals. Every age group also has their own comfort temperature. It is therefore, for example, important to follow the temperature in a livestock facility for both health/welfare as well as management issues. A sudden drop in temperature due to cold wind from the north blowing on the building can be an alarm for potential disease outbreak, and, e.g., on the basis of said alarm the temperature can be raised, whereas the same drop due to malfunctioning heating or ventilation is clearly a management issue, e.g. which could incite, e.g., a farmer or veterinarian, to initiate reparation of the malfunctioning heating or ventilation.

The relative humidity sensor 204 positioned opposite from the temperature sensor on the outside of the housing, measures the relative humidity inside the livestock facility. Temperature in combination with the relative humidity determines the feeling temperature. For example, in humans, 30° C. will feel different with 50% humidity or 90% humidity, where the latter will feel less pleasant because it's harder to transfer body heat by sweating. Combination of temperature sensor 203 and relative humidity sensor 205 provides the feeling temperature inside the livestock facility. The combination of temperature and relative humidity provides information on the environment in which livestock animals grow. Deviations from the adequate environment for growing livestock animals can be detected early and possible disease outbreaks can be predicted earlier with this information by a third party, e.g. by a veterinarian or a farmer.

The LEDs 205 are positioned inside the housing and indicate the device status to the user. The colors of the LEDs 205 report both on the status of the hardware device itself as well as data issues. In an example case, six LEDs are positioned inside the housing with a translucent cover for indicating the status of the device. The color of the LEDs is indicative of the status of the livestock facility such as purple color may indicate that the device is not connected to the internet, green color may indicate that the device is online and the status is ok, red color may indicate that there is a potential disease outbreak in the livestock facility, preferably based on a very high amount of coughing, sneezing, snicking and/or screaming in the livestock facility, yellow color may indicate an intermediate state indicating the need of increased vigilance, etc.

The device comprises a light sensor 206 located in the interior of the bottom translucent part of the housing opposite to the LEDs such that it is not influenced by the light of LEDs. It is configured to measure the light intensity in the livestock facility. The light sensor will be used to keep track of night and day. This can be the natural night and day or an artificial pattern of night and day imposed with lights in order to improve the growing of certain species.

The device 200 comprises a loudspeaker 207 placed in the middle of the bottom part at the center of all the microphones. The placement ensures that it is equidistant from all the microphones and facilitates automatic quality measurements of the microphones. It allows for playing a predefined sound with known composition. When the microphones, which are lying just around it, record this sound, resulting in microphone signals, the difference between the original sound played by the loudspeaker and the microphone signals, or the correlation between the original sound and the microphone signals, or the correlation between pairs of microphones, can provide information on the quality of the microphones. The loudspeaker is further configured to play sound for the livestock animals and/or workers, wherein the sound may include but not limited to a calming sound for the livestock animals, classical music or the sound of natural vocalizations of the mother animal, music to improve the work environment of the workers, etc. The combination of the loudspeaker and microphones makes the device interactive by allowing a farmer or administrator of the facility to interact using voice based commands. The microphones pick up the voice of the farmer which is further analyzed by the processor to determine the appropriate response which is played to the farmer from the loudspeaker. The loudspeaker 207 and the microphones 202 may be further utilized to measure the acoustics of the room. With two or more microphones in combination with the loudspeaker a model can be made from the acoustics of the room, and can distinguish a big, reverberant room from a small, non-reverberant room. The knowledge about the acoustics of the room is beneficial for the classification of different sounds.

Figure 3:
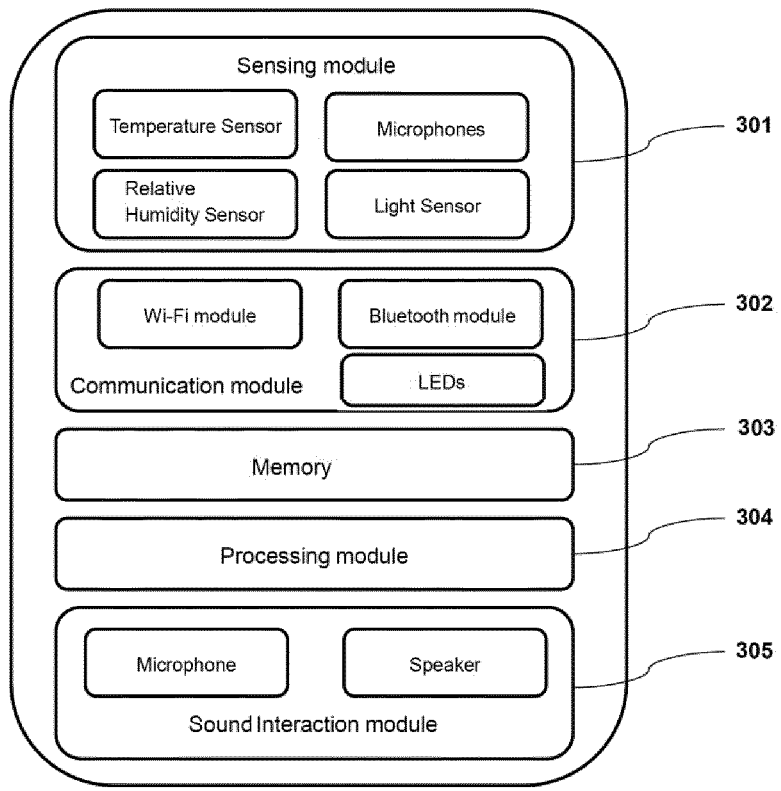
FIG. 3 illustrates a block diagram of various modules present in the monitoring device.

Description of FIG. 3

FIG. 3 illustrates various modules present in the monitoring device 200. As shown in the figure the device comprises a sensing module 301 comprising microphones, which microphones can also be interpreted as acoustic sensors, a temperature sensor, a relative humidity sensor, and a light sensor, a communication module 302 comprising LEDs, a wireless communication module, preferably a Wi-Fi module, and a module configured for exchanging data wirelessly over short distances using short-wavelength ultra-high-frequency radio waves in industrial, scientific and medical radio bands from 2.400 to 2.485 GHz, preferably a Bluetooth module, a memory 303 configured to store output produced by the sensors, processing module 304 for processing output received from the microphones in combination with the output received from the other sensors to identify the status of the livestock facility and a sound interaction module 305 configured to allow user interaction with the device, the interaction comprising capturing user's voice through the microphone and providing output related to the status of the livestock facility through loudspeaker, and/or configured to allow interaction of the device with the livestock animals, and/or configured to allow microphone quality measurements by playing a predefined sound of known composition by the loudspeaker and recording the sound by the microphones, resulting in microphone signals, and determining the difference between the original sound played by the loudspeaker and the microphone signals, or the correlation between the original sound and the microphone signals, or the correlation between pairs of microphones. A non-limiting example of a configuration to allow interaction of the device with the livestock animals is the playing of calming sounds through the loudspeaker in response to detected aggression of the livestock animals or as a response to boredom one could initiate a game with sounds for example. The industrial, scientific and medical radio bands are radio bands (portions of the radio spectrum) reserved internationally for the use of radio frequency (RF) energy for industrial, scientific and medical purposes other than telecommunications.

The sensors in the sensing module monitor the environmental conditions in the livestock facility. The LEDs are configured to indicate the status of the device by indicating a different color for different status.

The Wi-Fi module allows the device to communicate with other devices installed in the facility and/or user devices to provide real time updates regarding the status of the livestock facility. The livestock facility further comprises a gateway as an internet access point using wired (Ethernet cable) or wireless connection (4G router). All the devices within reach of the gateway (either directly or indirectly through other devices) will be detected and connected automatically via a wireless communication mesh network, preferably a Wi-Fi mesh network, and/or via a plurality of Ethernet cables suitable to physically connect the devices to the gateway. It is advantageous that the plurality of Ethernet cables can ensure connection of the devices to the gateway when for some reasons the wireless communication mesh network would fail working. A mesh network entails that a device that is out of reach of the gateway, but is within reach of another device that is in reach of the gateway, can also connect to the gateway, through the other device. The mesh network is a dynamic network which means that if a device cannot reach the gateway through a certain path, it will try to find another set of devices, through which, it can reach the gateway. The gateway may also be equipped with solid state drives to store raw audio recording.

The Bluetooth module allows tracking the movement of the staff through the livestock facility and improves the biosecurity by determining the order in which the livestock animals should be visited such as first the younger and healthy livestock animals and only later the bigger and sick livestock animals).

Memory 303 is used to store sensor data locally in the device. Memory may include but not limited to magnetic storage units, optical storage units, RAM, ROM, hard drives, flash memory, etc.

Figure 4:
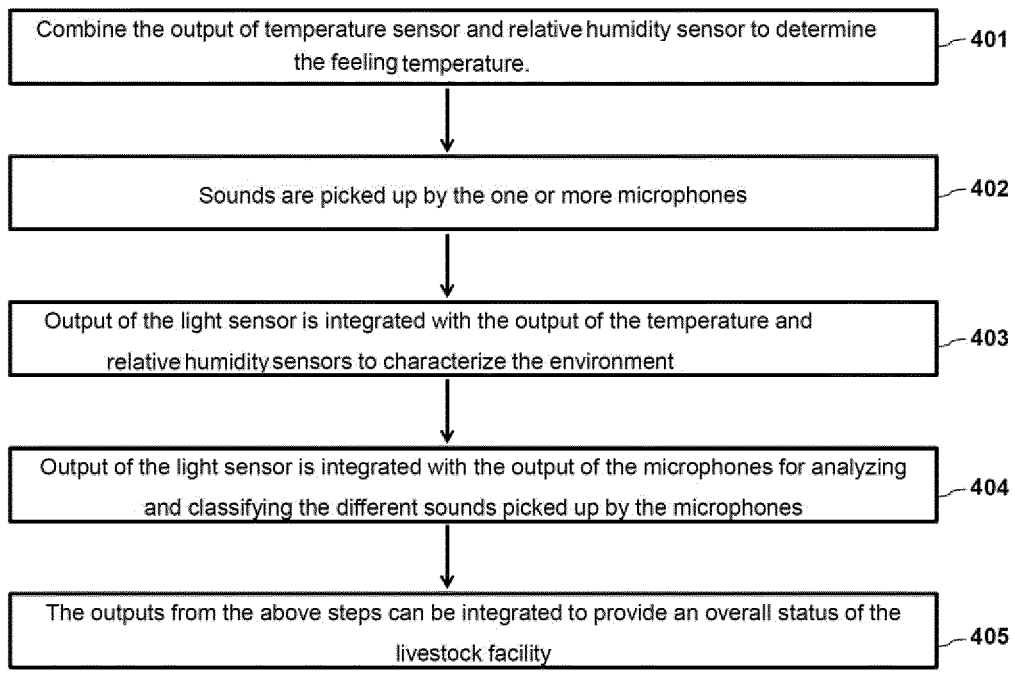
FIG. 4 shows a flowchart of the steps followed by the processing module for monitoring livestock animals in a livestock facility.

The processing module 304 processes the output produced by the various sensors in combination with the output produced from the microphones to identify the status of the livestock facility as illustrated in more details in FIG. 4. The processing module further performs a beamforming operation (or alternative technique) to combine the signals captured by the microphones to localize the sounds generated by the livestock animals and the sounds generated by the noise sources such as heating systems, ventilation systems, feeding lines, etc. The localization of sound sources help in determining the direction coordinates of the origin of the sound which can further be used for filtering noise generated by noise sources, analyzing the potential malfunctioning of the specific machines producing the noise and determining the position of healthy and unhealthy livestock animals.

The sound interaction module 305 allows the users to interact with the monitoring device by giving voice commands to the device which are picked up by the microphones. The device responds to the commands by playing the required answer through the loudspeakers. Additionally, the sound interaction module 305 may allow interaction of the device with livestock animals. A non-limiting example of a configuration to allow interaction of the device with livestock animals is the playing of calming sounds through the loudspeaker in response to detected aggression of the livestock animals. Additionally, the sound interaction module 305 may allow microphone quality measurements by playing a predefined sound of known composition by the loudspeaker and recording the sound by the microphones, resulting in microphone signals, and determining the difference between the original sound played by the loudspeaker and the microphone signals, or the correlation between the original sound and the microphone signals, or the correlation between pairs of microphones Description of FIG. 4

FIG. 4 shows a flowchart of the steps followed by the processing module for monitoring the status of the livestock facilities. A novel feature of the device is that it takes into account the interdependency of different sensor values to monitor livestock animals in livestock facilities. For example, when livestock animals don't calm down within a certain period where it becomes dark then it could indicate something abnormal happening such as a disease or other disturbing factors for the livestock animals. In this case, the output of light sensor (indicative of dark in the surroundings) is utilized in combination with output from microphones (indicative of sounds of aggression or disease) and/or temperature or relative humidity sensor (indicative of non-favorable environment or malfunctioning of the heating and/or ventilation systems) to determine the status of the livestock facility and take appropriate measure to mitigate the problems. The processing module thus helps in, e.g., handling health/welfare as well as management issues on the livestock facilities. A sudden drop in temperature due to cold wind can be an alarm for potential disease outbreak, whereas the same drop due to malfunctioning heating or ventilation is clearly a management issue.

As shown in figure, at step 401 the output of temperature sensor and relative humidity sensor is combined to determine the feeling temperature. At step 402 various sounds are picked up by the one or more microphones. At step 403 the output of the light sensor is integrated with the output of the temperature and relative humidity sensors to characterize the environment in which the livestock animals are growing (cold-warm, humid-dry, day-night). Most livestock facilities have fixed temperature threshold for different times of the days to ensure the healthy growth of livestock animals and keep them in their most thermo comfortable zone. Deviations from this adequate temperature can be detected early and the failures in various temperature regulating systems can be detected more robustly. The findings can be integrated in a health and/or welfare monitoring system for the prediction of possible disease outbreaks based on changing environmental parameters (such as temperature drops) and/or malfunctioning of the various systems installed on the facilities for maintaining the temperature (heating and ventilation systems).

At step 404 the output of the light sensor is integrated with the output of the microphones for analyzing and classifying the different sounds picked up by the microphones. As an example, the output of the light sensor can be combined with the output from the microphones in order to look for specific events in the night by only listening to the sound during the night. The operations in a livestock facility and the behavior of livestock animals are different during the day as compared to the night. The livestock animals are likely to be more active during the day, compared to the night. Similarly, more feeding lines are operational during the daytime. Deviations from this pattern (i.e. non-active during the day) can also be related to the health/welfare of the livestock animals and malfunctioning of the feeding line systems, and can be predicted by combining light sensor and microphones.

At step 405, the outputs from the above steps can be integrated to provide an overall status of the livestock facility. The status can be indicated to the farmer and/or veterinarian using one or more color of the LEDs or communicated as voice response through the loudspeaker.

Figure 5:
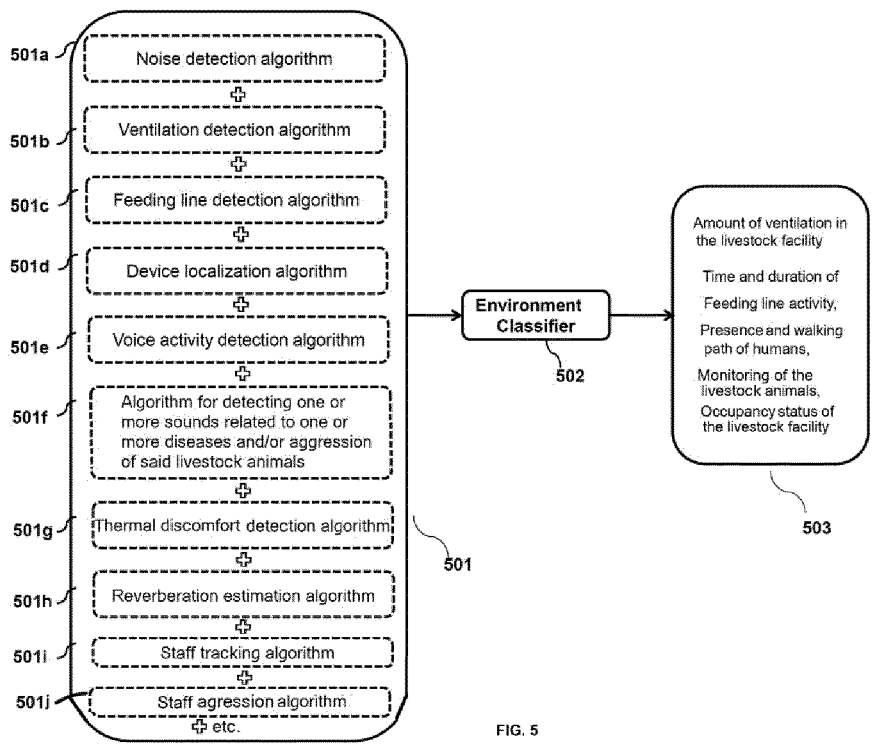
FIG. 5 illustrates environment classifier which combines different algorithms to detect activities in a livestock facility in accordance with the monitoring device illustrated in FIG. 2.

Description of FIG. 5

FIG. 5 illustrates an environment classifier which combines different sensors in different algorithms to detect activities in a livestock facility in accordance with the monitoring device illustrated in FIG. 2. The environment classifier indicates at any moment in time what is happening in the livestock facility by combining the output of different sensors in different algorithms. As shown in the figure various algorithms shown in box 501 such as noise reduction algorithm 501a, ventilation detection algorithm 501b, feeding line detection algorithm 501c, device localization algorithm 501d, voice activity detection algorithm 501e, algorithm for detecting one or more livestock animal sounds related to one or more diseases and/or aggression of said livestock animals 501*f*, sounds of high activity, tail biting, coughing, sneezing, snicking and screaming being non-limiting examples of said livestock animal sounds, temperature shock detection algorithm 501*g*, reverberation estimation algorithm 501*h*, staff tracking algorithm 501*i*, staff aggression algorithm 501*j*, etc. are combined by environment classifier 502 to provide information related to activities happening at the livestock facility at any moment of time. The activities on the livestock facility 503 may be activities performed by the livestock animals such as coughing, sneezing, screaming, etc., activities performed by humans in the livestock facility (workers or thieves) and the functioning of various systems such as ventilation systems, heating systems, feeding lines, cleaning systems, music systems, etc.

The environment classifier indicates what is happening in the livestock facility, both animal-related as non-animal related based on the different sensors available and the output provided by the processing module. In general the non-animal related detectors/estimators should provide enough information to make a rough sketch of the livestock facility, both size of the livestock facility as well as the localization of the devices, the ventilation system, the feeding lines, and other equipment (that make noise or produce heat). Non-animal related information combined with the input from the different sensors is utilized for analyzing the health and/or welfare of the livestock animals and potential malfunctioning of certain machines. The algorithms utilized by the environment classifier are described below:

Noise reduction algorithm: May be but is not limited to a standard noise reduction algorithm based on spectral subtraction which is intended to decrease the noise level without affecting the signal quality.

Ventilation detection algorithm: It is used to estimate the stationary noise source in the frequency range that is specific for ventilation systems based on but not limited to time-frequency representation of the audio signal. Further, using multiple microphones localization of the ventilation system can be determined. This will provide information related to the temperature distribution over the livestock facility, especially in big airspaces with multiple monitors in which the temperature sensors in different monitors can be combined.

Feeding line detection algorithm: It is used to investigate the typical sounds related to feeding lines based on but not limited to the time-frequency representation of the audio signal. Different types of feeding lines exist such as dry feed, liquid feed with different distinguishing sound characteristics such as repetitive noise source, pneumatic valves, . . .

Algorithm for detecting one or more livestock animal sounds related to one or more diseases and/or aggression of said livestock animals: It is used to determine aggression (sounds of high activity, screaming, tail biting etc.) and potential disease outbreaks (sounds of coughing, sneezing, snicking, etc.) among the livestock animals based on but not limited to time-frequency representation of the audio signal. When the algorithm detects aggression in the livestock facility, the loudspeaker can play classical music or natural vocalizations of the mother animal to bring down heartbeat and blood pressure in the livestock animals, and eventually bring down aggression amongst the livestock animals.

Voice activity detection algorithm: It is based on but not limited to time-frequency representation to determine sound characteristics of human voices by extracting audio features from certain sound events and classify speech and non-speech. The algorithm detects the presence and potentially the walking path of humans in the livestock facility, and can automatically start playing music to improve the work environment of the workers.

Device localization algorithm: In big airspaces, multiple devices will be installed to cover the health and/or welfare of the livestock animals. The device localization algorithm determines wireless communication signal strength, preferably Wi-Fi signal strength, between all pairs of devices in the wireless communication network, preferably the Wi-Fi mesh network. By using the relation between signal strength and distance, the localization of the devices in the room is estimated. It can be used for checking proper installation, and for correlating results from the sensors on the different devices within one airspace. An alternative for this device localization algorithm is by picking up the sound produced by one device with the multiple microphones of another device and estimate as such with all pairs of devices the location of all the devices.

Temperature shock detection algorithm: This algorithm combines temperature and relative humidity to examine whether livestock animals are comfortable or experiencing a temperature shock.

Reverberation estimation algorithm: This uses loudspeaker and one or more microphones to analyze the reverberation in the room to estimate the size of the room which is based on playing an impulse through the loudspeaker and record and further analyze the decay time of the impulse picked up by one or more microphones. Alternatively, the reverberation estimation algorithm uses one or more microphones to analyze the reverberation in the room to estimate the size of the room which is based on sounds picked up by the one or more microphones and the recording and further analysis of the decay time of the sounds picked up by the one or more microphones. In a preferred embodiment, the reverberation estimation algorithm can also be used to determine acoustics from sounds, on the basis of which a big livestock facility can be distinguished from a smaller livestock facility. Blind estimation of acoustics is really important for having better accuracy in classification algorithms, for distinguishing big and small farms and to track the growth of livestock animals, because the acoustics change with growing animals.

Staff tracking algorithm: This utilizes wireless technology for data exchange over short distances using short-wavelength ultra-high-frequency radio waves in industrial, scientific and medical radio bands from 2.400 to 2.485 GHz, preferably Bluetooth, inside the device and a device configured for tracking data wirelessly exchanged over short distances using short-wavelength ultra-high-frequency radio waves in industrial, scientific and medical radio bands from 2.400 to 2.485 GHz, preferably a Bluetooth tracker (badge, mobile phone or others from the staff), that visualizes the walking path of the staff through the livestock facility.

Staff aggression algorithm: It is used to determine aggression by staff, which could be detected as sounds of raised voices, screaming and or secondary loud sounds produced by staff, such as the sound of a staff member kicking against a fence.

The output of the environment classifier can be communicated to the user through a web application or it can be provided to the user over voice command played using the loudspeaker. In relation to the latter, a voice synthesis algorithm that translates words into sound is preferably used.

Figure 6:
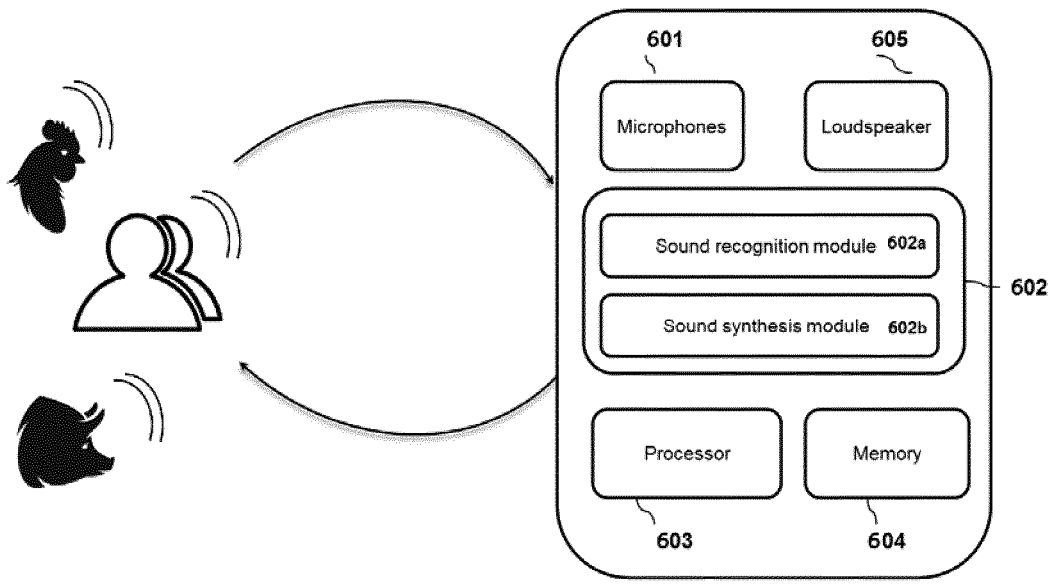
FIG. 6 illustrates a sound interaction mechanism between the device and the farmer for allowing interaction to obtain the status of various sensors and overall status of the livestock facility

Description of FIG. 6

FIG. 6 illustrates a sound interaction mechanism between the device and the user for allowing interaction to obtain the status of various sensors and overall status of the livestock facility. The sound interaction allows the user to obtain the status of various sensors and overall status of the livestock facility by issuing voice commands and receiving voice based responses played back through the loudspeakers. The user's voice is captured by the microphones 601 which are then fed into a sound interaction module 602. The sound interaction module comprises sound recognition module 602a and a sound synthesis module 602b. The user's voice captured by the microphones is fed to the sound recognition module 602a which is in this case configured as a voice recognition system. The module performs voice to text conversion to extract the words in the captured voice to determine the requirements of the user. The required information is fetched from the processing module which in turn provides the information by processing the various sensor output stored in the memory. The required information is later converted into sound by using a sound synthesis algorithm and is played back to the user through the loudspeaker. Following are some of the example cases of where sound interaction is helpful.

- A user, for example a farmer or a veterinarian, enters the livestock facility and asks about the health and/or welfare during the night or the change in health and/or welfare since his last visit. This can be done by speaking out a wake-up command to place the device in listening mode, followed by the ask-health and/or welfare-status command. The device answers with the information asked.
- A user can ask for the status of a specific sensor (temperature, relative humidity, light, weather forecast . . . ) by using the wake-up command followed by the ask-sensor-status command. The answer will be played back by the loudspeaker The sound interaction further enables two way interactions where the device can query the user and the responses can be stored in the device's rule based engine for future analysis or for self-learning of the device. The device can ask: 'What is the heavy noise in the background', the user can reply and the system can learn from the answer to improve the environment classifier.

In a similar way as the here-above described sound interaction mechanism between the device and the user, as illustrated by FIG. 6, a sound interaction mechanism between the device and livestock animals is possible. A non-limiting example of a configuration to allow interaction of the device with livestock animals is the playing of calming sounds through the loudspeaker in response to detected aggression of the livestock animals or as a response to boredom one could initiate a game with sounds.

FIG. 7

Figure 7:
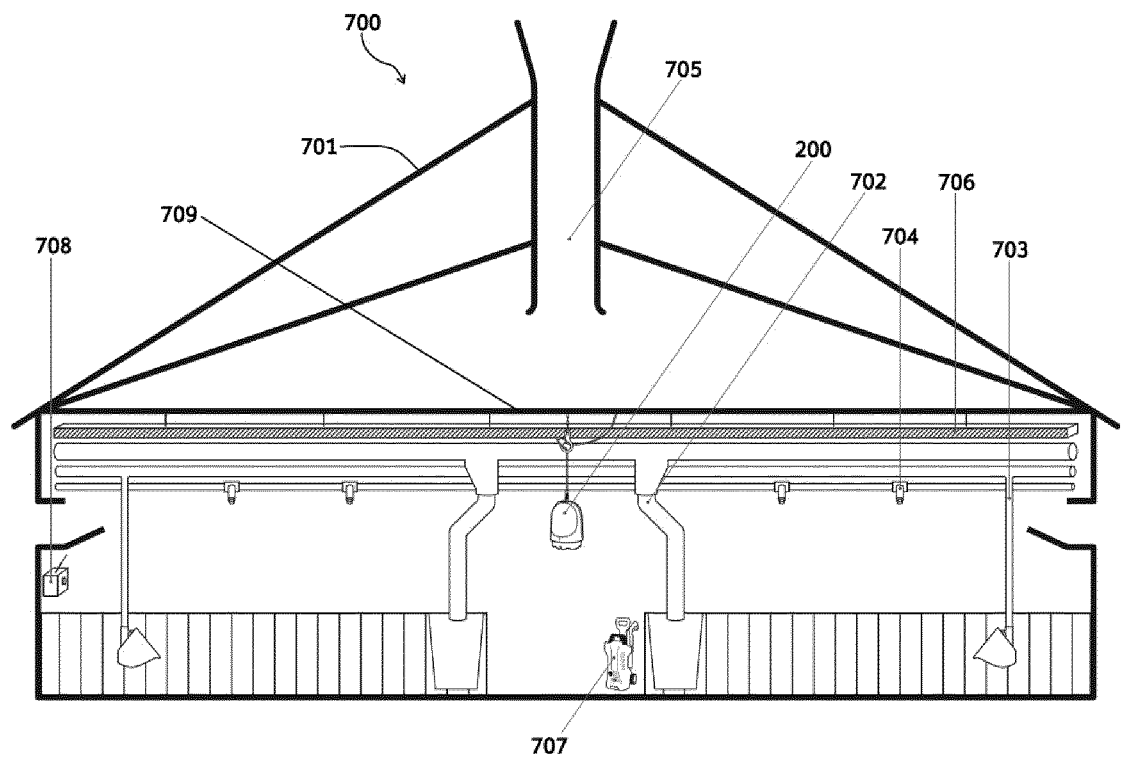
FIG. 7 illustrates a schematic representation of a system for monitoring a status of a livestock facility

FIG. 7 illustrates a schematic representation of a system 700 for monitoring the status of a livestock facility 701, wherein the status of the livestock facility 701 includes the monitoring of livestock animals when inside the livestock facility 701 and/or management status of external systems 702-708 when installed in the facility 701. The system comprises a livestock facility 701 and a device 200 of FIG. 2 placed inside the livestock facility 701. For a description of the embodiment of the device shown in FIG. 7 is referred to the description of FIG. 2 above. As can be seen in FIG. 7, the device 200 is placed centrally inside the livestock facility 701 and is specifically attached to the ceiling 709 in a downwards-oriented fashion. Accordingly, the device 200 is ideally suited for monitoring the status of a livestock facility 701, wherein the status of the livestock facility 701 includes the monitoring of livestock animals inside the livestock facility and/or management status of external systems 702-708 installed in the facility 701. Inside the livestock facility 701, the following external systems are placed: feeding lines 702, water lines 703 as types of drinking systems, sprinklers 704, a ventilation system 705, a heating lamp 706 as a type of heating system, a pressure wash system 707 as type of cleaning system, and a radio 708 as a type of music system. For the monitoring by the device 200 of said status of the livestock facility 701 is referred to the discussion FIG. 2 above. The system shown in FIG. 7 may also comprise a mobile apparatus, preferably a mobile phone, configured to receive output from the device, to store said output and to process said output. In the embodiment according to FIG. 7, the device 200 is placed centrally in an area with a diameter of 20 m (which is the area of the livestock facility 701 intended to accommodate livestock animals).

For example, 200 to 250 pigs may be accommodated in an area with a diameter of 20 m. For example, 4000-6000 chickens may be accommodated in an area with a diameter of 20 m. Accordingly, the system 700 including the device 200 according to FIG. 7 is suitable for accommodating and monitoring 200 to 250 pigs or 4000-6000 chickens. In larger livestock facilities, multiple devices are required to monitor the livestock animals. For example, 4 devices in a typical pig farm with 1000 animals, and 5 devices in a typical chicken farm with 25000 animals.

The preceding description of the disclosed embodiments is provided to enable a person skilled in the art to make or use the present invention. Various modifications of these embodiments will be readily apparent to those skilled in the art, and the general principles defined herein may be applied to other embodiments without departing from the spirit or scope of the invention. Thus, the present invention is not intended to be limited to the embodiments shown herein but to be accorded the widest scope consistent with the following claims and the principles and features disclosed herein.

The invention claimed is:

1. A method for monitoring a livestock facility and/or livestock animals in a livestock facility, the method comprising the steps of:
   a. receiving audio signals comprising sounds generated in a livestock facility from two or more microphones; and
   b. localizing sounds of interest in the audio signals, the sounds of interest being both sounds generated by livestock animals and sounds generated by noise sources, wherein the step of localizing further comprises the steps of:
      i. utilizing models of noise sources in an airspace based on localization in noise reduction algorithms to filter off noise sources from the audio signal, resulting in a filtered audio signal; and
      ii. analysing the filtered audio signal.

2. The method according to claim 1, wherein a beamforming operation or more advanced signal processing techniques such as neural networks, performed to combine the audio signals from two or more microphones into combined audio signals, are selected as techniques in the localization of sounds of interest.

3. The method according to claim 1, wherein the step of localizing further comprises the step of localizing the noise sources in an airspace to generate models of the noise sources in an airspace based on localization, prior to utilizing said models in noise reduction algorithms to filter off noise sources from the audio signal, resulting in a filtered audio signal.

4. The method according to claim 1, wherein the step of localizing further comprises the step of analysing the models of the noise sources in order to analyse the functioning and/or malfunctioning of corresponding systems in the livestock facility.

5. The method according to claim 1, wherein beamforming or more advanced signal processing techniques such as neural networks and localization techniques are based on time and/or level difference of the sound of interest in the received audio signals.

6. The method according to claim 1, wherein noise reduction algorithm is a standard classic noise reduction algorithm based on spectral subtraction.

7. The method according to claim 1, wherein the noise sources comprise ventilators, heating systems, cleaning systems, feeding lines, drinking systems, music systems, and/or human voices.

8. The method according to claim 1, wherein the localization of sounds generated by livestock animals is used to analyse the speed and direction of the spread of a certain disease in a livestock facility.

9. The method according to claim 1, wherein the localization of sounds generated by livestock animals is used to analyse welfare of livestock animals in a livestock facility.

10. The method according to claim 1, wherein the method further comprises an environment classifier which indicates different activities in a livestock facility by combining input from different sensors and analysing the input with different algorithms, which algorithms generate as output an indication of the different activities, wherein the different activities comprise activities performed by livestock animals, activities performed by humans, and functioning of one or more systems installed in a livestock facility selected from the group comprising ventilation systems, feeding lines, sprinklers, drinking systems, heating systems, cleaning systems, music systems and artificial lights, wherein the different algorithms are selected from the list comprising noise reduction algorithm, ventilation detection algorithm, feeding line detection algorithm, algorithm for detecting one or more livestock animal sounds related to one or more diseases and/or aggression of said livestock animals, voice activity detection algorithm, device localization algorithm, thermal discomfort detection algorithm, reverberation estimation algorithm, staff aggression algorithm and staff tracking algorithm.

11. The method according to claim 1, wherein the method is implemented using a monitoring device comprising two or more microphones, a loudspeaker, and a plurality of sensors.

12. The method according to claim 11, wherein the method further comprises implementing a sound interaction mechanism using the two or more microphones and loudspeaker of the monitoring device, wherein the sound interaction mechanism involves that based on one or more sounds detected by the microphones, the loudspeaker provides a response to that sound.

13. The method according to claim 11, wherein the outputs of different sensors and environment classifier of one or more devices in one or more airspaces is analysed over multiple production rounds of raising livestock animals with artificial intelligence in order to optimize animal production and welfare.

14. The method according to claim 1, wherein the livestock animals are selected from the group consisting of cattle, pigs, horses, goats, poultry, pets and any animal which can be raised in livestock facilities.

15. The method according to claim 1, wherein the analyzed filtered audio signal is used for monitoring health and/or welfare of the livestock animals.

* * * * *